United States Patent

[11] 3,634,013

| [72] | Inventors | Rudolf Maul<br>Benshein;<br>Rolf Rehberg, Dusseldorf, both of Germany |
|---|---|---|
| [21] | Appl. No. | 827,924 |
| [22] | Filed | May 26, 1969 |
| [45] | Patented | Jan. 11, 1972 |
| [73] | Assignee | Therachemie chemisch-therapeutische<br>Gessellschaft m.b.H.<br>Dusseldorf, Germany |
| [32] | Priority | May 30, 1968 |
| [33] | | Austria |
| [31] | | A5206/68 |

[54] AQUEOUS COUPLED HYDRAZONO HAIR-DYEING COMPOSITION AND PROCESS
9 Claims, No Drawings

[52] U.S. Cl..................................................... 8/11,
8/10, 8/10.1, 8/10.2, 8/41 B, 8/1.214, 8/1 S, 8/32,
8/173, 260/296 B, 260/156

[51] Int. Cl........................................................ D06p 1/32
[50] Field of Search............................................ 8/10, 10.1,
10.2, 11, 41, 1.214, 32, 1 S, 173; 96/9, 100;
260/296 B, 156

[56] References Cited
UNITED STATES PATENTS

| 3,423,392 | 1/1969 | Wunderlich et al. ......... | 8/41 |
|---|---|---|---|
| | | FOREIGN PATENTS | |
| 23,193 | 10/1905 | Great Britain................ | 8/32 |

*Primary Examiner*—George F. Lesmes
*Assistant Examiner*—Patricia C. Ives
*Attorney*—Hammond & Littell ABSTRACT: Compositions for dyeing hair comprising a coupling agent and a substituted or unsubstituted 5- or 6-member heterocyclic compound containing a hydrazono group at position 2, 3 or 4, with respect to the hetero atom.

AQUEOUS COUPLED HYDRAZONO HAIR-DYEING COMPOSITION AND PROCESS

PRIOR ART

It is known in the art to dye human hair with oxidation dyestuffs. In particular, phenylenediamines are used as the dyestuff components. Furthermore, it has already been proposed to use diaminopyridines for this purpose. These compounds are converted into the dyestuffs on the hair by oxidation either with air or by addition of chemical oxidizing agents, such as hydrogen peroxide. Although these known hair-dyeing agents are used to a considerable extent, they have disadvantages. The disadvantages reside in the fact that the formed dyestuffs represent no definite homogeneous compounds, and, in some cases, have a different reaction period allowing the dyestuff to react further at a later time. These dyestuffs are also difficult to remove.

It has now been discovered that hair dyes based on oxidation dyestuffs can be produced of homogeneous constitution which do not have the above-mentioned disadvantages.

OBJECTS OF THE INVENTION

It is an object of the present invention to prepare a composition for dyeing hair which comprises a coupling agent and a dye agent which is selected from heterocyclic hydrazono compounds containing at least one nitrogen atom in a 5- or 6-member ring.

It is another object of this invention to provide a composition for dyeing hair which has a definite reaction period.

It is a further object of this invention to provide a composition for dyeing hair and a process for its preparation whereby upon oxidation, the composition forms a homogeneous compound after a definite reaction period.

A still further object of this invention is the discovery of a hair-dyeing composition which can be easily removed from the hair.

INVENTION

The present invention pertains to a hair-dyeing composition which is composed of a known coupling agent and a dye component or a mixture of said dye components selected from substituted and unsubstituted 5- or 6-member heterocyclic hydrazono compounds.

Examples of coupling agents are hydroxyl and/or amino containing aromatic compounds and compounds with active methylene groups which are used in coupling reactions, especially pyrazolones, and diketones such as anilides of acetoacetic and benzoylacetic acids. Further examples of these classes of coupling agents which are especially suitable are aromatic amines and diamines, phenols, naphthols and aminophenols. In the case of the diamines, aminophenols and phenols, the metacompounds are preferred.

Specific examples of suitable coupling agents are the following m-phenylenediamine, m-aminophenol, anisidine, 2,4-diamino-anisole, m-tolylenediamine, resorcinol, resorcinol monoethyl ether, n-aminoresorcinol, 1,5-dihydroxynaphthalene, 1,6-dihydroxynaphthalene, 1,7-dihydroxynaphalene, 2,7-dihydroxynaphthalene, 1,5-amino- or 1,8-aminohydroxynaphthalene, α-naphthol, 8-hydroxyquinoline, 1-phenyl-3-amino-5-pyrazolone, 3-pyrazolone, 5-purazolone, 1-phenyl-3,5-diketopyrazolidine, 1-phenyl-5-pyrazolone-3-carboxylic acid amide, 1-phenyl-3-methyl-5-pyrazolone, benzoylacetanilide, benzoyl-m-anisidine, benzoylacetamino-2-methoxy-5-methylbenzene.

The dye component is a heterocyclic hydrazono compound, a salt thereof of inorganic or organic acid, or a reaction product of the heterocyclic compound and an organic acid chloride. The hydrazono group (=N—NH$_2$) of the heterocyclic compound may be on the 2, 3 or 4 position with respect to the hetero atom. Particularly suitable are the heterocyclic hydrazono compounds wherein the hydrazono group is located on the 2 or 4 position. These compounds have the following general formulas:

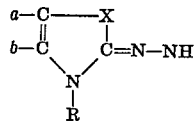
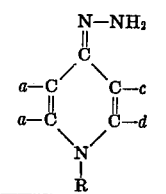

wherein $a,b,c$ and $d$ each individually designate a hydrogen atom; a lower alkyl radical, such as an alkyl radical of one to four carbon atoms; an aromatic group, preferably phenyl; a functional group such as amino, nitro, lower alkoxy, monoalkylamino, dialkylamino, and halogen, preferably bromine; where ($ab$) and ($cd$) designate whole or part of a condensed alicyclic or aromatic ring, preferably phenyl, unsubstituted or substituted with above-mentioned functional groups; including an alkanoyl amino group; where R is a straight or branched chain lower alkyl radical such as an alkyl radical of one to five carbon atoms; or a substituted or an unsubstituted phenyl ring, the substituents being selected from nitro and lower alkoxy groups; and where X is an atom or a group of atoms capable of closing an aromatic or nonaromatic ring, such as oxygen, sulfur, =NH, —CH$_2$—, and —CH=CH—, wherein the hydrogen atoms thereof may be replaced by alkyl radicals of one to four, and preferably, one to two, carbon atoms.

The following are specific examples of the above-mentioned: N-methyl-pyridone-4-hydrazone; 1,2,6-trimethyl-pyrdridone-4-hydrazone; 1,2,6-trimethyl-3-nitropyridone-4-hydrazone 1,2,6-trimethyl-3-amino-pyridone-4-hydrazone; N-methyl-quinolone-4-hydrazone; N-methyl-2-dimethylamino-pyridone-4-hydrazone; N-ethyl-2-diethylamino-pyridone-4hydrazone; N-methylthiazolone-hydrazone; N-methyl-pyridone-2-hydrazone; N,N'-dimethyl-benzimidazolone-hydrazone; N-methyl-benzthiazolone-2-hydrazone; 1-methyl-quinolone-2-hydrazone N-methyl-cyclohexenothiazolone-2-hydrazone; N-methyl-6-methoxy-benzthiazolone-2-hydrazone: 3,5-dimethylthiazolone-2-hydrazone; and 1,3,3,-trimethyl-indolinone-2-hydrazone.

Of the heterocyclic compounds which contain the hydrazono group in the 3 position, compounds of the following general formula are suitable as dye components:

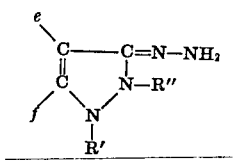

where R' and R" individually represent a straight or a branch chain lower alkyl radical such as an alkyl radical of one to four carbon atoms; where $e$ and $f$ each individually denote a hydrogen or a straight or a branch chain lower alkyl radical such as an alkyl radical of one to four carbon atoms; and where ($ef$) may represent whole or part of a condensed aromatic ring, preferably phenyl, unsubstituted or substituted with NO$_2$, CN, SO$_3$H or halogen groups, preferably chlorine atoms.

The following are specific examples of the heterocylic compounds which have the hydrazono group in the 3 position: 1,2-dimethyl-indazolone-3-hydrazone; 1,2-dimethyl-5-chloro-indazolone-3-hydrazone; 1,2-dimethyl-5-nitro-indazolone-3-hydrazone; 1,2-diethyl-indazolone-3-hydrazone; and 1,2,5-trimethyl-pyrazolone-3-hydrazone hydrochloride.

Also suitable as dye components are compounds of the thiazolidone-2-hydrazone type such as, for example, 3-methyl-thiazolidone-2-hydrazone.

It is frequently expedient to use the heterocyclic hydrazones in the form of their salts with inorganic or organic acids; the salts of sulphuric acid, oxalic acid and hydrochloric acid being especially suitable. The reaction products of the hydrazones with organic acid chlorides, in which case the acid residue is split off again during the coupling reaction, are technically equivalent to the salts. Examples of suitable reaction product are ω-benzenesulphonylhydrazones.

The preparation of the hydrazones is accomplished by known processes. It is frequently expedient to prepare directly the corresponding salt of the hydrazones with organic or inorganic acids, especially hydrochloric acid, instead of the specific hydrazone.

The coupling agents are usually used in substantially equimolar amounts with the dye components although it is not, generally, detrimental if a greater or a lesser amount is used than is required by the stoichiometry.

The formation of the dying composition always takes place according to the same reaction scheme which is illustrated below with N-methyl-pyridone-2-hydrozone, as the dye component, and α-naphthol, as the coupling agent.

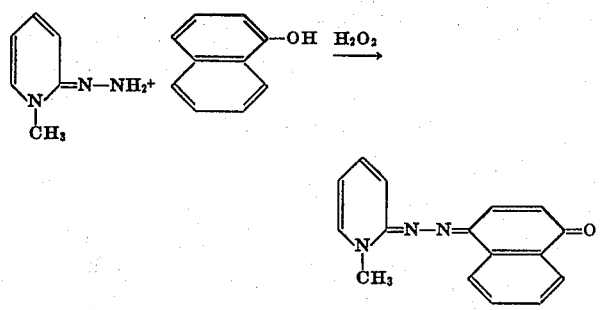

As in oxidation of other dyestuffs, the dye can be developed by oxygen from the air or by chemical oxidizing agents, preferably hydrogen peroxide or its addition products with urea, melamine, and sodium borate, such as percarbamide, melamine-perhydrate, and sodium perborate.

The hair is dyed at temperatures from 15° to 40° C., and preferably at room temperature. The hair dyeing composition may be used in the form of aqueous solutions, but preferably in a cream or an emulsion form. For this purpose, the heterocyclic hydrazones and the coupling components may be mixed with any wetting agents or washing agents especially anionic agents. Suitable wetting or washing agents are alkyl-benzene sulphonates, fatty alcohol sulphates, alkyl sulphonates, fatty acid ethanolamides, addition products of ethylene oxide and fatty acids, fatty alcohols and fatty alcohol ether sulphates.

The absorption capacity of the above-mentioned dyeing compositions is also good when they are admixed with such agents. The hair dyeing agents may be made in the form of shampoos, especially cream shampoos, which are often desired in practice.

In addition, thickeners, as for example, methylcellulose starch, higher fatty alcohols, vaselins, paraffin oil and fatty acids, and perfume oil or hair-care agents, as for example pantothenic acid and cholesterol, may be admixed with the dyeing composition described herein.

These additional substances are used in the amounts usual for these purposes. For example, from 0.5 to 30 percent by weight of wetting agent, and from 0.1 to 25 percent of thickener, in each case based on the total composition, are used. The concentration of the dyeing composition amounts altogether to 0.5 to 7 percent by weight, preferably 1 to 4 percent, also based on the total composition.

The hair dyeing agents may be applied in a weakly acidic, neutral, or preferably, alkaline pH range. The dyeings obtained with the above-mentioned hair dyeing composition have good properties with respect to light, washing and rubbing, and in contrast to the usual agents based on oxidation dyestuffs, can be easily removed with reducing agents such as sodium hydroxymethane-sulphinate.

The dyestuffs of dyeing compositions formed on application of the above-described agents are azo dyestuffs with a definite constitution and have, therefore, the advantage that practically no further reaction of the dyestuff on the hair can take place. The production of special shades, by mixing different dyestuffs, is likewise hereby facilitated. From small amounts of dyestuffs, as for example a blue, a red and a yellow, practically any desired tint can be produced.

EXAMPLES

Example 1

Two parts by weight of N-methyl-benzthiazolone-2-hydrazone and 1.54 parts by weight of 2,4-diaminoanisole are dissolved in an emulsion consisting of 10 parts by weight of fatty alcohol, 10 parts by weight of fatty alcohol sulphate and 70 parts by weight of water, the solution is adjusted to pH 9.5, mixed with 1 part by weight of hydrogen peroxide, and made up to 100 parts by weight.

The dye cream thus obtained dyes grey hair at 20° C. dark brown-red (mahogany) in a period of 30 minutes.

Example 2

Two parts by weight of N-methyl-thiazolidone-2-hydrazone and 1.9 parts by weight of 1,5-dihydroxy-naphthalene are incorporated in an emulsion as in example 1.

The dye cream so obtained dyes grey hair at a pH value of 9.5 brown-red (chestnut) in a period of 30 minutes.

Example 3

Two parts by weight of 1,2-dimethyl-indazolone-3hydrazone hydrochloride and 1.58 parts by weight of 1,5-dihydroxy-naphthalene are dissolved in an emulsion of 10 parts by weight of fatty alcohol, 10 parts by weight of fatty alcohol sulphate and 70 parts by weight of water. The solution is adjusted to pH 9.5, mixed with 1 part by weight of hydrogen peroxide, and made up to 100 parts by weight.

The dye cream so obtained dyes grey human hair at room temperature blue-violet in a period of 30 minutes.

Example 4

One part by weight of 1,2-dimethyl-indazolone-3-hydrazone hydrochloride and 0.52 parts by weight of resorcinol are dissolved in water. The solution is adjusted to pH 9.0, mixed with 1 percent of hydrogen peroxide, and made up to 100 parts by weight. After 20 minutes at a temperature of 30° C., a grey-brown coloration is obtained on human hair.

Example 5

Dye creams were prepared as described in example 3, with compounds given in the following table and designated as "dye component" and "coupling agent." Colorations given in the right-hand column of the table were obtained under similar conditions.

| Preparation No. | Dye component | Coupling agent | Color |
|---|---|---|---|
| 1 | N-methyl-pyridone-4-hydrazone | α-Naphthol | Brown. |
| 2 | do | Resorcinol-monomethyl ether | Red. |
| 3 | do | 1,6-dihydroxynaphthalene | Brown. |
| 4 | do | Resorcinol | Yellow. |
| 5 | do | 8-hydroxyquinoline | Violet. |
| 6 | N-methyl-thiazolone-2-hydrazone | Resorcinol-monomethyl ether | Red. |
| 7 | do | 1,7-dihydroxynaphthalene | Red-violet. |
| 8 | do | α-Naphthol | Do. |
| 9 | do | 2,4-diaminoanisole | Dark red-brown. |
| 10 | do | 1-phenyl-3-amino-5-pyrazolone | Yellow. |
| 11 | do | Resorcinol | Light brown. |
| 12 | do | 1-phenyl-3,5-diketo-pyrazolidine | Yellow. |
| 13 | do | 1-phenyl-3-methyl-5-pyrazolone | Yellow-brown. |
| 14 | do | Benzoylacetamino-2-methoxy-5-methylbenzene | Light-yellow. |
| 15 | N,N-dimethyl-benzimidazolone-2-hydrazone | α-Naphthol | Red-violet. |

| Preparation No. | Dye component | Coupling agent | Color |
|---|---|---|---|
| 16 | do | m-Toluylenediamine | Blue. |
| 17 | N-methyl-pyridone-2-hydrazone | α-Naphthol | Red-violet. |
| 18 | do | Resorcinol | Yellow-brown. |
| 19 | do | 2,4-diaminoanisole | Brown-red. |
| 20 | do | Resorcinol-monomethyl ether | Red. |
| 21 | do | 1-phenyl-5-pyrazolone-3-carboxylic acid amide | Yellow. |
| 22 | do | 8-hydroxyquinoline | Red-violet. |
| 23 | do | 1-phenyl-3-amino-5-pyrazolone | Yellow. |
| 24 | do | 1,5-dihydroxynaphthalene | Violet. |
| 25 | N-methyl-benzthiazolone-2-hydrazone | do | Dark brown-red. |
| 26 | do | 1,7-dihydroxynaphthalene | Red-violet. |
| 27 | do | m-Toluylenediamine | Brown-red. |
| 28 | do | 1-phenyl-3-methyl-5-pyrazolone | Yellowish. |
| 29 | do | Resorcinol | Yellow-brown. |
| 30 | do | α-Naphthol | Red-brown. |
| 31 | do | Resorcinol-monomethyl ether | Do. |
| 32 | do | 1,5-dihydroxynaphthalene | Brown. |
| 33 | do | 1-phenyl-3-amino-5-pyrazolone | Yellow. |
| 34 | do | 1-phenyl-3,5-dike to pyrazolidine | Yellowish. |
| 35 | N-methyl-thiazolidone-2-hydrazone | 8-hydroxyquinoline | Light-brown. |
| 36 | do | 2,4-diaminoanisole | Yellow brown. |
| 37 | 1,2-dimethyl-indazolone-3-hydrazone | α-Naphthol | Blue-violet. |
| 38 | do | 1,7-dihydroxynaphthalene | Blue. |
| 39 | do | 2,4-diaminotoluene | Brown. |
| 40 | do | 2,4-diaminoanisole | Do. |
| 41 | do | 1-phenyl-3-methyl-5-pyrazolone | Green. |
| 42 | do | 1,6-dihydroxynaphthalene | Blue-violet. |
| 43 | 1,2,6-trimethyl-pyridone-4-hydrazone | 1,5-dihydroxynaphthalene | Red violet. |
| 44 | do | Resorcinol | Yellow. |
| 45 | do | m-Diaminoanisole | Red-brown. |
| 46 | do | 1-phenyl-3-methyl-5-pyrazolone | Yellow-brown. |
| 47 | 1-methyl-quinolone-2-hydrazone | α-Naphthol | Red-brown. |
| 48 | do | 1,5-dihydroxynaphthalene | Do. |
| 49 | do | 1,6-dihydroxynaphthalene | Brown-violet. |
| 50 | do | Resorcinol | Brown-red. |
| 51 | do | m-Toluylenediamine | Brown-violet. |
| 52 | do | 1-phenyl-3-methyl-5-pyrazolone | Yellow-brown. |
| 53 | do | 1-phenyl-5-pyrazolone-3-carboxylic acid amide | Yellow. |
| 54 | do | 8-hydroxy-quinoline | Violet-red. |
| 55 | 1,2,6-trimethyl-3-nitropyridone-4-hydrazone | α-Naphthol | Brown-red. |
| 56 | do | 1-phenyl-3-methyl-5-pyrazolone | Yellow-brown. |
| 57 | do | Resorcinol-monomethyl ether | Brown-yellow. |
| 58 | 1,2,6-trimethyl-3-aminopyridone-4-hydrazone | 2,4-diaminoanisole | Brown-red. |
| 59 | do | Resorcinol | Yellow-brown. |
| 60 | N-methyl-cyclohexenothiazolone-hydrazone | α-Naphthol | Violet. |
| 61 | do | 1,6-dihydroxynaphthalene | Do. |
| 62 | do | 1-phenyl-3-methyl-5-pyrazolone | Yellow. |
| 63 | do | 1-phenyl-5-pyrazolone-3-carboxylic acid amide | Yellow-brown. |
| 64 | 1,2,5-trimethyl-pyrazolone-3-hydrazone | α-Naphthol | Purple. |
| 65 | do | 1,6-dihydroxynaphthalene | Brown-violet. |
| 66 | do | 1,5-dihydroxynaphthalene | Do. |
| 67 | do | Resorcinol | Brown. |
| 68 | do | 8-hydroxyquinoline | Red. |
| 69 | 1,2-dimethyl-5-chloro-indazolone-3-hydrazone | α-Naphthol | Blue-violet. |
| 70 | do | 1,7-dihydroxynaphthalene | Blue. |
| 71 | 1-methyl-2-ethyl-5-nitro-indazolone-3-hydrazone | α-Naphthol | Black-brown. |
| 72 | do | 1,5-dihydroxynaphthalene | Do. |
| 73 | do | Resorcinol | Dark red-brown. |
| 74 | N-methyl-quinolone-4-hydrazone | 1,5-dihydroxynaphthalene | Blue-grey. |
| 75 | do | 2,4-diaminoanisole | Dark blue. |
| 76 | do | m-Toluylenediamine | Dark violet. |
| 77 | do | 1-phenyl-3-methyl-5-pyrazolone | Light brown. |
| 78 | do | 1-phenyl-3-amino-5-pyrazolone | Yellow. |
| 79 | N-methyl-benzthiazolone-(2)-[ω-benzenesulphonyl-hydrazone] | α-Naphthol | Red-brown. |
| 80 | do | 1,5-dihdroxynaphthalene | Brown. |
| 81 | N-methyl-benzthiazolone-2-hydrazone | Benzoylacetanilide | Yellow-brown. |
| 82 | N-methyl-pyridone 2-hydrazone | do | Yellowish. |
| 83 | N-methyl-thiazolone-2-hydrazone | do | Do. |
| 84 | do | Benzoylacet-(3'-methoxy)-anilide | Do. |
| 85 | N-methyl-benzthiazolone-2-hydrazone | do | Yellow-brown. |
| 86 | N-methyl-pyridone-2-hydrazone | do | Yellowish. |
| 87 | do | Benzoyl-(2'-methoxy-5'-methyl)-anilide | Do. |
| 88 | 1,2,5-trimethyl-pyrazolone-3-hydrazone | do | Do. |
| 89 | do | Benzoylacet-(3'-methoxy)-anilide | Do. |
| 90 | N-methyl-pyridone-2-hydrazone | Acetoacetic acid anilide | Do. |
| 91 | N-methyl-6-nitrobenzthiazolone-2-hydrazone | m-Diaminotoluol | Brown. |
| 92 | N-methyl-6-anilino-benzthiazolone-2-hydrazone | 1,5-dihydroxynaphthalene | Brown-red. |
| 93 | N-methyl-6-acetaminobenzthiazolone-2-hydrazone | m-Diaminoanisole | Brown. |
| 94 | N-methyl-6-ethoxybenzthiazolone-2-hydrazone | α-Naphthol | Red-brown. |
| 95 | N-methyl-6-chlorobenzthiazolone 2-hydrazone | 1-phenyl-3-aminopyrazolone-5 | Yellow-brown. |
| 96 | N-ethyl-benzthiazolone-2-hydrazone | Resorcinol | Do. |
| 97 | N-methyl-4-phenylthiazolone-2-hydrazone | 3-amino-pyrazolone-5 | Yellow. |
| 98 | N-phenyl-4-tert-butylthiazolone-2-hydrazone | 1,7-dihydroxynaphthalene | Red-violet. |
| 99 | N-(4-methoxyphenyl)-4-methyl-thiazolone-2-hydrazone | 1-phenyl-3,5-diketo-pyrazolidine | Yellow. |
| 100 | do | Resorcinol | Brown. |
| 101 | N-ethyl-2-diethylaminoquinolone-4-hydrazone | 8-oxyquinoline | Red-violet. |
| 102 | N-methyl-3,5-dibromopyridone-4-hydrazone | m-Diaminoanisole | Red-brown. |
| 103 | N-methyl-2-ethylaminopyridone-4-hydrazone | 1-phenyl-3-aminopyrazolone-5 | Yellow-brown. |
| 104 | N-ethyl-3,3-dimethylindolinone-2-hydrazone | 3-amino-pyrazolone-5 | Light brown. |
| 105 | 1,2-dimethyl-6-nitroindazolone-3-hydrazone | α-Naphthol | Black-brown. |
| 106 | 1,2-dimethyl-6-cyanoindazolone-3-hydrazone | 1,5-dihydroxynaphthalene | Do. |
| 107 | 1-methyl-2-ethyl-6-nitro-indazolone-3-hydrazone | m-Diaminotoluol | Dark brown. |
| 108 | 1,2-diethyl-6-nitroindazolone-3-hydrazone | α-Naphthol | Do. |
| 109 | N-methyl-benzoxazolone-2-hydrazone | 1-phenyl-3-aminopyrazolone-5 | Yellow. |
| 110 | N-methyl-2-dimethylamino-pyridone-4-hydrazon | 1,7-dihydroxynaphthalene | Violet. |
| 111 | N-ethyl-2-diethylamino-pyridone-4-hydrazone | m-Diaminoanisole | Brown-red. |
| 112 | N-methyl-6-methoxybenzthiazolone-2-hydrazone | 1,5-dihydroxynaphthalene | Blue-violet. |
| 113 | 3,5-dimethyl-thiazolone-2-hydrazone | Resorcinol-monomethyl ether | Red. |
| 114 | 1,3,3-trimethylindolinone-2-hydrazone | 3-amino-pyrazolone-5 | Light brown. |
| 115 | 1,2-diethyl-indazolone-3-hydrazone | 2,4-diaminotoluol | Brown. |

Practically identical results were obtained when, instead of the above compounds, corresponding salts of the hydrazones with inorganic or organic acids were used. Hydrochloric acid is the preferred acid.

Various modifications of the dyeing composition described herein may be made without departing from the spirit and scope thereof. It is to be understood that the herein described invention is to be limited only as defined by the appended claims.

We claim:

1. Process for the dyeing of human hair which consists essentially of applying to human hair at a temperature of from 15° to 40° C. for a time sufficient to effect dyeing, an aqueous solution containing from 0.5 to 7 percent by weight of a mixture of component A and component B in substantially equimolar amounts, said component A being a heterocyclic hydrazono compound selected from the group consisting of a. compounds of the formula

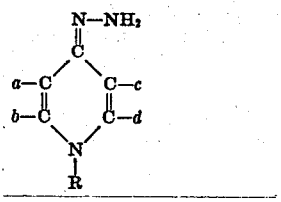

b. compounds of the formula

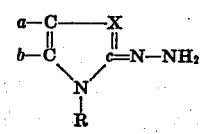

wherein $a$, $b$, $c$ O—, $d$, individually are members selected from the group consisting of hydrogen, lower alkyl, phenyl, di-lower alkylamino, mono-lower alkylamino, amino, nitro, lower alkoxy and halogen; and where $ab$ and $cd$ together are part of a condensed ring selected from the group consisting of cyclohexeno, benzo, lower alkylbenzo, lower alkoxybenzo, nitrobenzo, anilinobenzo, halobenzo and lower alkanoylaminobenzo; R is selected from the group consisting of lower alkyl, phenyl, nitrophenyl, nitrophenyl and lower alkoxyphenyl; and X represents a bivalent linkage from the group consisting of —O—, —S—, —NH—, —CR$_2'''$— and —CR$'''$=CR$'''$—, where R$'''$ is a member selected from the group consisting of hydrogen and alkyl having from one to four carbon atoms;

c. compounds of the formula

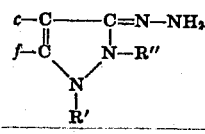

wherein $e$ and $f$ individually are members selected from the group consisting of hydrogen and lower alkyl and where $ef$ together are part of a condensed ring selected from the group consisting of benzo, nitrobenzo, cyanobenzo and halobenzo; and R' and R'' are lower alkyl d. mixtures of (a), (b) and (c);

e. salts of (a), (b) and (c) with acids selected from the group consisting of sulfuric acid, oxalic acid and hydrochloric acid; and f. reaction products of the hydrazono group of compounds (a), (b) and (c) with benzenesulphonic acid chloride; and said component B being an oxidative coupling compound selected from the group consisting of (1) hydroxyl and amino substituted benzene, lower alkoxy benzene, lower alkylbenzene and naphthalene, (2) pyrazolones having an activated methylene, and (3) anilides of acetoacetic and benzoylacetic acid.

2. The process of claim 1 wherein said aqueous solution has a further content of from 0.5 to 30 percent by weight of a wetting agent selected from the group consisting of alkylbenzene sulphonates, fatty alcohol sulphonates, alkyl sulfonates, fatty acid ethanolamides, ethylene oxide adducts of fatty alcohols and fatty acids, and fatty alcohol ethyleneglycol ether sulphates.

3. The process of claim 1 wherein said aqueous solution has a further content of from 0.1 to 25 percent by weight of thickeners selected from the group consisting of methylcellulose, starch, higher fatty alcohols, vaseline, paraffin oils and fatty acids.

4. The process of claim 1 wherein said aqueous solution has a further content of a chemical oxidizing agent.

5. Process of claim 4 wherein said chemical oxidizing agent is selected from the group consisting of hydrogen, peroxide and its addition products with urea, melamine, and sodium borate.

6. An aqueous solution for the dyeing of human hair containing from 0.5 to 7 percent by weight of a mixture of component A and component B in substantially equimolar amounts, said component A being a heterocyclic hydrazono compound selected from the group consisting of a. compounds of the formula

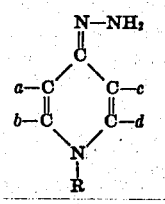

b. compounds of the formula

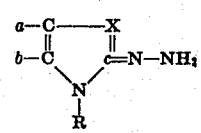

wherein $a$, $b$, $c$ and $d$, individually are members selected from the group consisting of hydrogen, lower alkyl, phenyl, di-lower alkylamino, mono-lower alkylamino, amino, nitro, lower alkoxy and halogen; and where $ab$ and $cd$ together are part of a condensed ring selected from the group consisting of cyclohexeno, benzo, lower alkylbenzo, lower alkoxybenzo, nitrobenzo, anilinobenzo, halobenzo and lower alkanolyamino-benzo; R is selected from the group consisting of lower alkyl, phenyl, nitrophenyl and lower alkoxyphenyl; and X represents a bivalent linkage selected from the group consisting of —O—, —S—, —NH—, —CR$_2'''$—and —CR$'''$=CR$'''$—, where R$'''$ is a member selected from the group consisting of hydrogen and alkyl having from one to four carbon atoms;

c. compounds of the formula

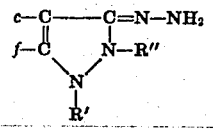

wherein $e$ and $f$ are members selected from the group consisting of hydrogen and lower alkyl and where $ef$ together are part of a condensed ring selected from the group consisting of benzo, nitrobenzo, cyanobenzo and halobenzo; and R' and R'' are lower alkyl d. mixtures of (a), (b) and (c)

e. salts of (a), (b) and (c) with acids selected from the group consisting of sulfuric acid, oxalic acid and hydrochloric acid; and f. reaction products of the hydrazono group of compounds (a), (b) and (c) with benzenesulphonic acid chloride; and said component B being an oxidative coupling compound selected from the group consisting of (1) hydroxyl and amino substituted benzene, lower alkoxy benzene, lower alkylbenzene and naphthalene, (2) pyrazolones having an activated methylene, and (3) anilides of acetoacetic and benzoylacetic acid.

7. The aqueous solution for the dyeing of human hair of claim 6 wherein said aqueous solution has a further content of from 0.5 to 30 percent by weight of a wetting agent selected from the group consisting of alkylbenzene sulphonates, fatty alcohol sulphonates, alkyl sulphonates, alkyl sulphonates, fatty acid ethanolamides, ethylene oxide adducts of fatty alcohols and fatty acids, and fatty alcohol ethyleneglycol ether sulphates.

8. The aqueous solution for the dyeing of human hair of claim 6 wherein said aqueous solution has a further content of from 0.1 to 25 percent by weight of thickeners selected from the group consisting of methylcellulose, starch, higher fatty alcohols, vaselin, paraffin oils and fatty acids.

9. The aqueous solution for the dyeing of human hair of claim 6 wherein said aqueous solution has a further content of a chemical oxidizing agent.

* * * * *